United States Patent
Bates et al.

(10) Patent No.: US 6,665,710 B1
(45) Date of Patent: Dec. 16, 2003

(54) SEARCHING LOCAL NETWORK ADDRESSES

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/568,678

(22) Filed: May 11, 2000

(51) Int. Cl.[7] .............................................. G06F 15/16
(52) U.S. Cl. ....................... 709/217; 709/219; 709/245; 707/10
(58) Field of Search ................................ 709/203, 217, 709/219, 245; 707/3, 5, 10

(56) References Cited

U.S. PATENT DOCUMENTS

| | | | | |
|---|---|---|---|---|
| 6,018,342 A | * | 1/2000 | Bristor ........................ 345/840 |
| 6,047,313 A | * | 4/2000 | Hashimoto et al. ......... 709/203 |
| 6,278,993 B1 | * | 8/2001 | Kumar et al. ................... 707/3 |
| 6,360,215 B1 | * | 3/2002 | Judd et al. ...................... 707/3 |
| 6,480,853 B1 | * | 11/2002 | Jain ............................ 707/10 |
| 6,493,702 B1 | * | 12/2002 | Adar et al. ..................... 707/3 |
| 6,535,912 B1 | * | 3/2003 | Anupam et al. ............ 709/217 |
| 2001/0011365 A1 | * | 8/2001 | Helfman ........................ 717/1 |
| 2001/0044795 A1 | * | 11/2001 | Cohen et al. ................... 707/5 |
| 2003/0046281 A1 | * | 3/2003 | Son ............................... 707/6 |
| 2003/0055870 A1 | * | 3/2003 | Smethers .................... 709/203 |

FOREIGN PATENT DOCUMENTS

WO    WO-0048057    *    8/2000

* cited by examiner

Primary Examiner—Hosain T. Alam
Assistant Examiner—Oanh L Duong
(74) Attorney, Agent, or Firm—Moser Patterson & Sheridan, LLP

(57) ABSTRACT

A method, article of manufacture and apparatus for searching local and non-local user-specific data for network addresses previously-visited by the user. In one embodiment, a network search tool allows the user to more quickly find the addresses previously-visited by matching search criteria to user-specific data and optionally combining those results obtained from a search of the network.

23 Claims, 4 Drawing Sheets

SEARCHING LOCAL NETWORK ADDRESSES

BACKGROUND OF THE INVENTION

1. Field of the Invention

The present invention relates to data processing. More particularly, the invention relates to a mechanism for specifically searching data specific to a user's network address browsing history.

2. Background of the Related Art

Computer networks provide a powerful and convenient environment for maintaining information, which may be shared by multiple end-users. However, the growing size of networks, particularly the Internet, makes it difficult to locate relevant information in an expedient fashion. As a result, search tools were developed to locate information on the network based on a query input by a user. Two common search methods include the use of search engines and directories, both having capability to search listings. One difference between search engines and directories is in the manner in which each tool compiles listings. Search engines comprise a search tool referred to as a spider, a crawler or a robot, which builds indexes containing the traversed addresses according to well-known protocols and algorithms. A user-input query in the form of phrases, keywords, Uniform Resource Locators (URLs), etc., prompts the search engine to sift through the plurality of network addresses (typically on the order of millions) in the index to find matches to the user query. The results are displayed to the user for review and selection. One example of a search engine developed for use on the Internet is HotBot®.

Directories also include an index containing information, which is provided to the user according to a query. However, directories do not utilize spiders to compile the index. Instead, human operators manually retrieve relevant information and store the information to the directory. One example of a directory is Yahoo®.

The advantages of search engines and directories have been combined resulting in a hybrid search engine. The hybrid search engine uses a spider but includes a directory to ensure that a search will necessarily include the contents of the directory.

Regardless of the particular search tool structure, conventional search tools reside on a server accessible to multiple users. Search queries are sent from the users to the search tools via a network connection. The search tools then parse the query and execute a search algorithm to identify any network addresses containing information matching the query. In theory, spiders are capable of traversing the entire Internet to locate matching URLs. In practice, however, only a small fraction of the Internet is traversed. Directories are similarly limited because the indexes are selectively compiled by human operators. Accordingly, the effectiveness of conventional search tools is limited.

Another problem with conventional search tools is the relevancy of the search results is dependent on the user's ability to craft a query. Many times the user may simply want to return to a previously-visited network address (e.g., web address). However, conventional search tools have no "memory" of a particular user's history on the network. Thus, the search will include a survey of the index maintained by the search engine or directory. Consequently, the user's search query may return numerous irrelevant results and may not even include the one of interest to the user.

One method for a user to return to a previously-visited network address on the network is through book-marking, a feature typically supported by a browser program. A browser program, such as Netscape Navigator®, provided by Netscape Communications of Mountain View, Calif., is a Graphical User Interface (GUI), which allows the user to display web pages. A user searching (referred to as browsing) the network for information may visit a plurality of network addresses using the browser program. When the user finds a site of interest, to which he or she may want to return, the user stores the address for the site to as a bookmark. The bookmark is typically placed within a bookmark folder, or sub-folder, accessible to the browser program. Subsequently, the user may return to the network address by accessing the bookmark folder, and subfolders, rather than attempting to locate the network address using a search engine or directory. Thus, bookmarks provide the user a convenient means of facilitating information storage and retrieval.

Overtime however, bookmarks and bookmark folders become unmanageable due to the volume of addresses contained therein. Therefore, frustrated users avoid adding additional network addresses to the bookmark folder, thereby rendering the folder useless and requiring the user to rely on search tools to revisit sites. Therefore, there is a need for a search tool adapted to search previously-visited network addresses for results that match a search query and display the results in a meaningful way.

SUMMARY OF THE INVENTION

The present invention generally provides a method, article of manufacture and apparatus for searching local and non-local user-specific data comprising network addresses previously-visited by the user. In one embodiment, a network search tool allows the user to more quickly find the addresses previously-visited by matching search criteria to user-specific data and optionally combining those results obtained from a search of the network.

In one aspect of the invention, a method is provided for searching for information on a network of computers comprising a computer connected to the network of computers, the method comprising: receiving search request information by a first search tool; determining, by the first search tool, whether network information located on the network of computers satisfies the search request information; returning search results by the first search tool; and determining whether one or more network addresses stored in memory associated with the computer satisfy the search results.

In another aspect of the invention, a signal-bearing media containing a search tool program which, when executed by a computer connected to a network of computers, causes at least one of the computer or the network of computers to perform the steps of:

(a) parsing search request information;
(b) determining whether network information located on the network of computers satisfies the search request information;
(c) returning search results; and
(d) determining whether one or more network addresses stored in memory associated with the computer satisfy the search results.

One aspect of the invention includes a computer system comprising: a computer comprising a processor and a memory; a network of computers connected to the computer; one or more search tools resident on at least one of the computer and the network of computers, wherein the one or more search tools, when executed, are configured to perform steps comprising: (a) determine whether network information located on the network of computers satisfies a search query; (b) if network information satisfies the search query, return search results; and (c) determine whether one or more network addresses stored in the memory satisfy the search results.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the in the appended drawings.

It is to be noted, however, that the appended drawings illustrate only typical embodiments of this invention and are therefore not to be considered limiting of its scope, for the invention may admit to other equally effect embodiments.

FIG. 4 depicts a flow diagram of a method for searching user-specific data involving a network search tool adapted to receive and search user-specific data and network data.

DETAILED DESCRIPTION OF THE PREFERRED EMBODIMENT

Preferred embodiments of the invention include a method, article of manufacture and apparatus for searching network information and user-specific data comprising, for example, network addresses. In one embodiment, the user-specific data is compared to results of a network search. The matching results of the comparison are then displayed to a user. In other embodiments, a network search is limited to user-specific network addresses, e.g., addresses stored in a memory by the user. Illustratively, the present invention allows for a search of user-specific data comprising previously-visited network addresses within, for example, a user's computer where network addresses may be located in bookmark files and/or memory.

As will be described below, aspects of the preferred embodiment pertain to specific method steps implementable on computer systems. In one embodiment, the invention may be implemented as a computer program-product for use with a computer system. The programs defining the functions of the preferred embodiment can be provided to a computer via a variety of signal-bearing media, which include but are not limited to, (i) information permanently stored on non-writable storage media (e.g. read-only memory devices within a computer such as read only CD-ROM disks readable by a CD-ROM or DVD drive; (ii) alterable information stored on a writable storage media (e.g. floppy disks within diskette drive or hard-disk drive); or (iii) information conveyed to a computer by communications medium, such as through a computer or telephone network, including wireless communication. Such signal-bearing media, when carrying computer-readable instructions that direct the functions of the present invention, represent alternative embodiments of the present invention. It may also be noted that portions of the product program may be developed and implemented independently, but when combined together are embodiments of the present invention.

Figure 1:
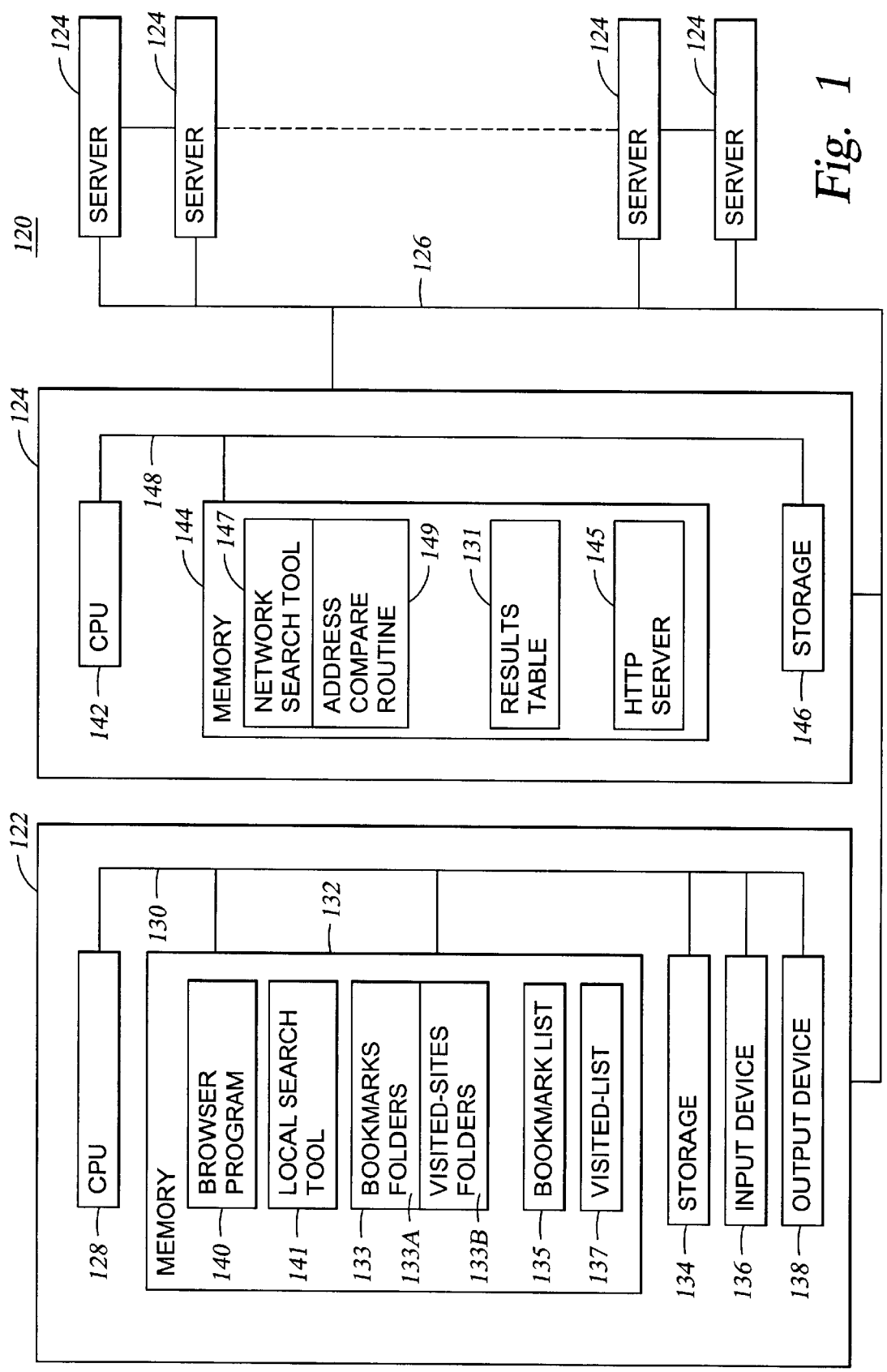
FIG. 1 depicts a data processing system in which the preferred embodiment may be implemented.

FIG. 1 depicts a data processing system 120 in which the preferred embodiment of the invention may be implemented. In general, the data processing system 120 includes a client (e.g. user's) computer 122 and at least one server 124 (five such servers 124 are shown). The client computer 122 and the server computer 124 may be the components of the same computer system, or may be connected via a network 126, such as the Internet. The client computer 122 includes a Central Processing Unit (CPU) 128 connected via a bus 130 to a memory 132, storage 134, input device 136, and output device 138. The input device 136 can be any device to give input to the client computer 122. For example, a keyboard, keypad, light-pen, touch-screen, track-ball, or speech recognition unit could be used. The output device 138 is preferably any conventional display screen and, although shown separately from the input device 136, the output device 138 and input device 136 could be combined. For example, a display screen with an integrated touch-screen, and a display with an integrated keyboard, or a speech recognition unit combined with a text speech converter could be used.

Memory 132 is preferably random access memory sufficiently large to hold the necessary programming and data structures of the invention. While memory 132 is shown as a single entity, it should be understood that memory 132 may in fact comprise a plurality of modules, and that memory 132 may exist at multiple levels, from high speed registers and caches to lower speed but larger DRAM chips. Memory 132 contains a browser program 140 that, when executed on CPU 128, provides support for navigating between the various servers 124 and locating network addresses at one or more of the servers 124. Memory 132 also contains user-specific data 133 comprising records of network addresses (on the servers 124) that have been previously accessed or otherwise retrieved by the client computer 122. Illustratively, the user-specific data 133 includes a bookmark folder 133A containing bookmarks of network addresses and a visited sites folder 133B containing network addresses previously-visited by a user operating the client computer 122. User specific-data 133 may comprise data either specific to the client computer 122, that many people may have access to, and/or data specific to a particular user who may login under a "user-name." For example, as each member of a family browses the network 126 using the computer 122, the data related to the entire family's network browsing history may be cataloged. Additionally, the browser program 140 typically allows for user personalization of browser features and bookmarks. Therefore, it is contemplated that each family member could have an individual user-name and a personalized bookmark folder 133A and visited-sites folder 133B. In addition, within memory 132 is comprised a bookmark-list 135 and a visited-list 137 of network addresses generated by the browser program 140 using method 300 described below.

Preferably, the bookmarks folder 133A is generated by the user using bookmarking features supported by the browser 140. The visited sites folder 133B is preferably generated automatically by the browser 140 each time a site is visited by the client computer 122. The visited sites folder 133B may be generated using methods known in art whereby network addresses are stored to storage area belonging to the client computer 122. Conventionally, network information for visited sites may be saved locally to facilitate subsequent returns to the site and to "customize" Internet surfing according to user preferences (using "cookies" for example). One example of a conventional visited sites folder, which may be used to advantage by the present invention, is the "history" folder for Netscape Navigator® 4.0, provided by Netscape Communications of Mountain View, Calif. Although user-specific data 133 is shown residing within memory 132, user-specific data 133 may be stored in any volatile, or non-volatile, data storage area such as storage 134. Additionally, user-specific data 133 may be stored on and retrieved from the network 126 including servers 124.

Storage 134 is preferably a Direct Access Storage Device (DASD), although it is shown as a single unit, it could be a combination of fixed and/or removable storage devices, such as fixed disc drives, floppy disc drives, tape drives, removable memory cards, or optical storage. Memory 132 and storage 134 could be part of one virtual address space spanning multiple primary and secondary storage devices.

Each server computer 124 generally comprises a CPU 142, and storage 146, coupled to one another by a bus 148. The memory 144, is a random access memory sufficiently large to hold the necessary programming and data structures that are located on the server computer 124 according to a network address, e.g. a URL. As shown, the memory 144 includes a Hypertext Transfer Protocol (http) server process 145 adapted to service requests from the client computer 122 regarding HTML documents. The http server process 145 is merely illustrative and other embodiments are contemplated adapted to support any known and unknown protocols. The programming and data structures may be accessed and executed by the CPU 142 as needed during operation.

In one embodiment, a network search tool 147 resides within memory 144. When executed on CPU 142 in response to receipt of a search query, the network search tool 147 searches the system of servers 124 for information pertaining to the query. The network search tool 147 includes a network address comparison routine 149 that when executed on CPU 142, compares data files for matching network addresses and generates a results table 131 located within memory 144.

Referring to FIG. 1, an alternate embodiment of the present invention pertains to local search tool 141. Local search tool 141, when executed on CPU 128 in response to a search query is adapted to search data files, including user-specific data 133, located on the computer system 122. Local search tool 141 may be integral to, or separate from, the browser program 140.

FIG. 1 is merely one hardware configuration for data processing system 120. A preferred embodiment of the present invention can apply to any comparable hardware configuration, regardless of whether the computer system is a complicated, multi-user computing apparatus, a single-user workstation, or network appliance that does not have non-volatile storage of its own.

Figure 2:
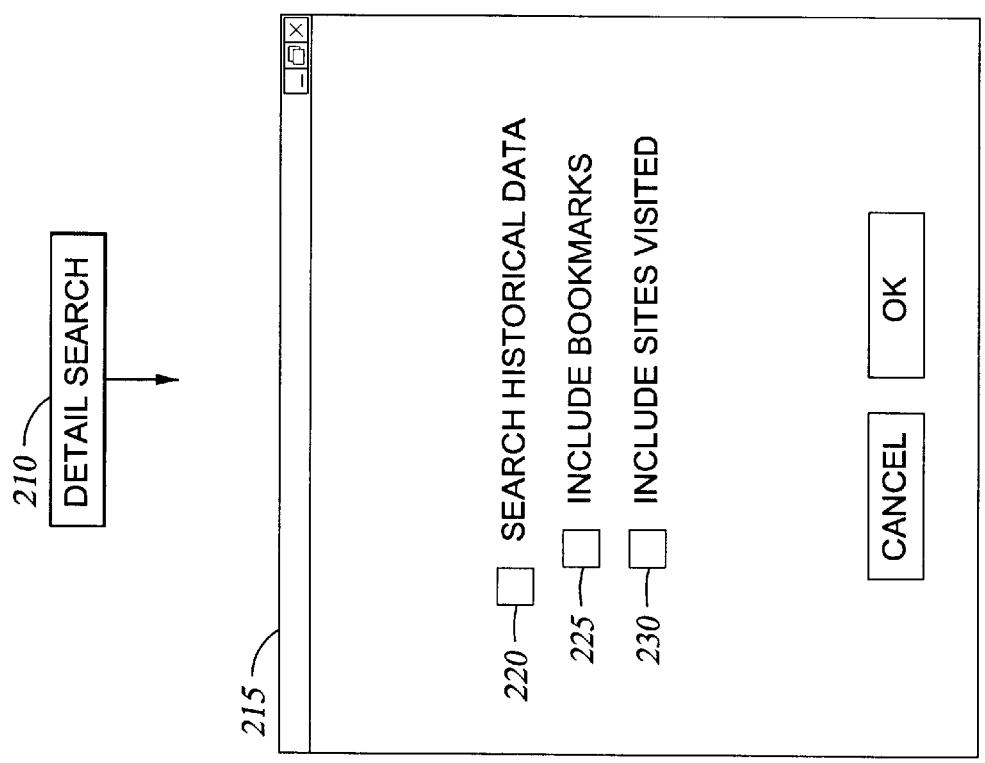
FIG. 2 depicts a graphical user interface display screen allowing the user to select from various user-specific data to be included in the search.

FIG. 2 depicts a GUI interface 200 integral to a browser program 140 for use with the present invention. FIG. 1 is referenced within the following discussion of FIG. 2 as is necessary. FIG. 2 depicts an embodiment of the invention using features (e.g., radio buttons and check-boxes) for selecting user-specific data 133 as search criteria. Detail-search button 210, when selected, activates a data search criteria window 215.

Search criteria window 215 comprises a "search historical data" check box 220 that further comprises sub-selections including an "include bookmarks" check box 225 and an "include sites-visited" check box 230. When activated, window 215 allows the user to include user-specific data 133 in a search of the network 126. Check boxes 225 and 230 provide additional flexibility to the user in determining which user files are included in the search. Thus, when check box 225 is selected the search includes all network addresses contained in the bookmark folder 133A and when check box 230 is selected all network addresses contained in the visited sites folder 133B are included in the search.

It is contemplated that the visited sites folder 133B may include all the sites contained in the bookmarks folder 133A in which case selecting both check boxes may result in duplicate search results being returned to the user. Therefore, in one embodiment, the check boxes 225 and 230 are only independently selectable. In other embodiments, other steps can be taken to eliminate duplicate search results such as eliminating all but one of the duplicative search results when both check boxes are selected. If no selection within window 215 is made, then the search would not be limited by user-specific data 133.

The GUI interface 200 facilitates the selection of the user-specific data 133 areas to be included in a search. Although the preferred embodiment of the invention utilizes the GUI interface 200 within the browser program 140, in another aspect of the invention the GUI interface need not be resident within the browser program 140. Thus, for example, the GUI interface 200 could be a separately executable stand-alone module usable in combination with the browser 140.

Figure 3:
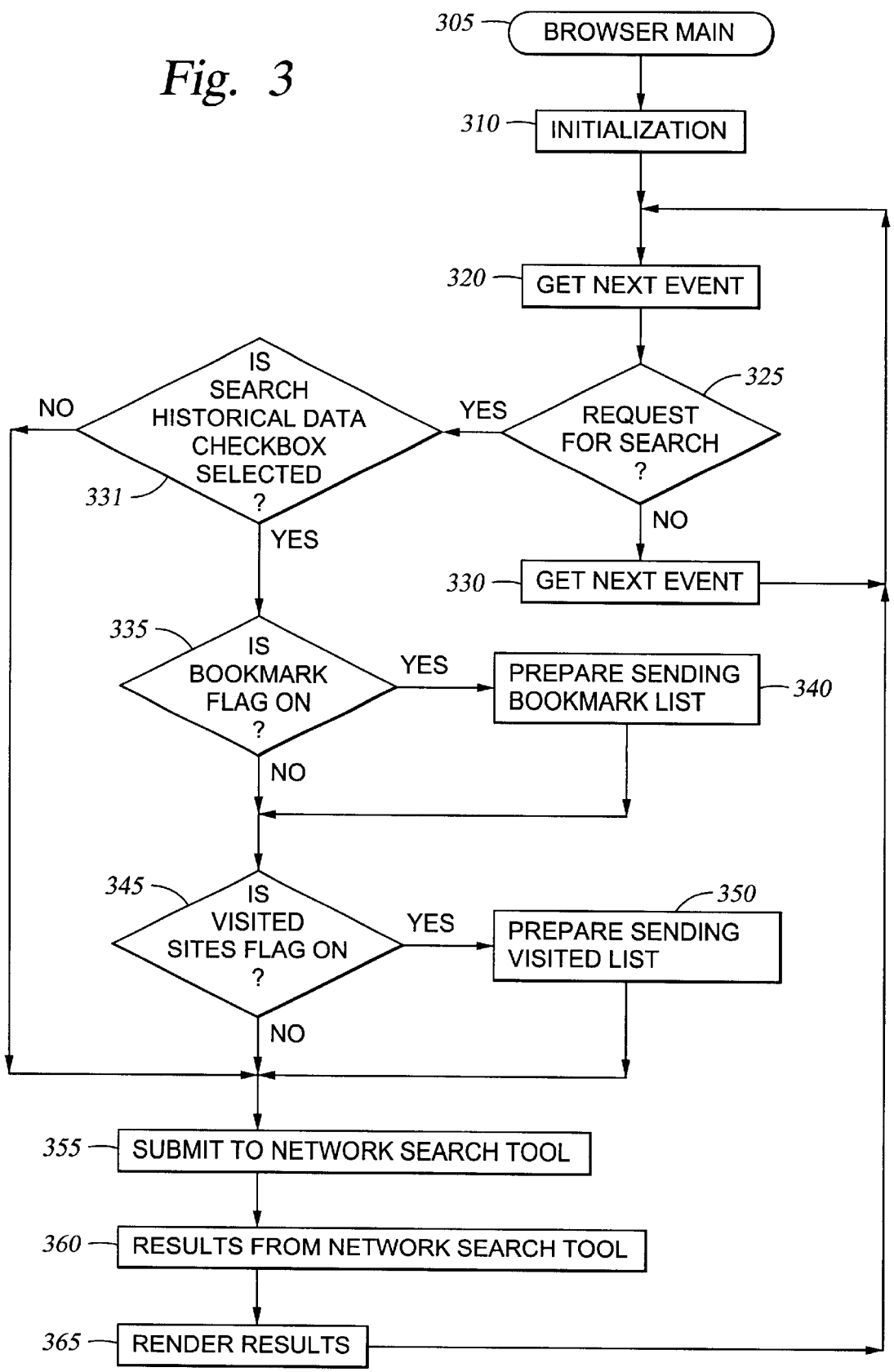
FIG. 3 depicts a flow diagram of a method for utilizing user-specific data involving a browser program, transference of user-specific data to a network search tool, and displaying the results of a search.

FIG. 3 depicts a flow diagram of a method 300 for searching user-specific data 133. As necessary, FIG. 1 and FIG. 2 are referenced in the following discussion of FIG. 3. In general, FIG. 3 depicts an embodiment for a method 300 for utilizing a browser program 140 adapted for compiling a list of selected user-specific data 133 to be searched, transferring a search query including the user-specific data 133 to the network search tool 147, and facilitating an output of final results from the network search tool 147 to the browser program 140 for display to an end user.

The method of FIG. 300 is entered into at step 305, when for example the user executes the browser program 140. The browser program 140 is initialized at step 310 to begin browsing the network 126 and accessing data from network 126 for display to a user. Illustratively, upon initialization at step 310, the browser program 140 may be configured to allow users to set a default network address to start browsing the network 126, use a default network address established by the browser program 140, or select a blank display and the like.

Once the initialization process 310 is complete, the browser program 140 receives browser program 140 events at step 320. Illustratively, browser program 140 events may include entering a network 126 address into an address window, opening bookmarks of visited network 126 addresses, scrolling-down the previously-visited network address history cache files (typically found in a pull down menu in the URL entry text field) of the browser program 140, receiving a search query and the like.

At step 325, the browser program 140 determines whether the event is a search query or not. If the browser program 140 does not detect a search query, the method 300 proceeds to step 330 to handle the event according to known methods. Subsequently, the method 300 returns to step 320 to get the next event.

If the event being processed by the browser 140 is a search query, then the method 300 proceeds to step 331 where a determination is made as to whether the "search historical-data" check box 220 of the GUI 200 has been selected. As noted above with reference to FIG. 2, a user may elect to include user-specific data 133 by first clicking on the "detail-search" radio button 210 and then selecting check box 220 (activating the local search feature). If the check box 220 has not been checked, a search is performed in a manner known in the art. That is, a search query comprising user-input search criteria is transmitted to the search tool 147 at step 355 and the search results are returned to the client computer 122 for display to the user at steps 360 and 365.

In the event that the check box 220 is checked, the method 300 proceeds to step 335 to determine whether the user has elected to include the bookmarks folder 133A in the search. Thus, the method 300 may determine whether check box 225 has been checked. If the user has not selected check box 225 method 300 proceeds to step 345. If the user has selected-check box 225, then at step 340 the browser program 140 prepares a bookmark-list of bookmark network address data 135 contained in the bookmarks folder 133A, for transmittal to the network search tool 147. Upon completion of the list of bookmarks, method 300 proceeds to step 345.

At step 345 the method 300 determines whether the user has elected to include the visited-sites folder 133B in the search. Thus, the method 300 may determine whether check box 230 has been checked. If the user did not select to search visited-sites folder 133B, then the method 300 advances to step 355 where the search request, including any information from step 340, is submitted to the network search tool 147. If the user has selected to search visited-sites folder 133B, then at step 350 the browser program 140 prepares a visited-list 137 of previously-visited network addresses, contained in the visited-sites folder 133B, for transmittal to the network search tool 147.

At step 355, the search request (including the lists prepared at step 340 and 350) is submitted to the network search tool 147. A plurality of methods for data transfer on networks are known in the art, such as the Transmission Control Protocol and Internet Protocol (TCP/IP). Other methods exist to transfer data files, such as the File Transfer Protocol (FTP) and Gopher. Whatever method of file transfer is used at step 355, the search request is transferred (e.g., uploaded) to network search tool 147 for processing at step 355.

Once search query including selected user-specific data 133 is transferred at step 355, the network search tool 147 searches the network 126 in response to the search query. Network search tool 147 uses robots (e.g. spiders), or other methods to parse, search, and index the network data matching the search query. Embodiments of the operation of the search tool 147 are described in detail below.

At step 360, the browser program 140 receives the search results from the network search tool 147. At step 365, the results from the network search tool 147 are rendered by the browser program 140 and displayed to the user. The results may be displayed on the output device 138 (e.g. a CRT) in any format allowing the user to view the results. Subsequently, the method 300 returns to step 320 to retrieve the next event.

One embodiment of the present invention includes a step before transmittal at step 355 where the user is alerted, e.g., by browser program 140, to give permission for the transmittal of user-specific data 133 to the network 126. The user may deny permission to send user-specific data 133, ending the search. If permission is given, the data is submitted to the network search tool 147 at step 355.

FIG. 4 depicts a flow diagram of a method 400 for searching user-specific data 133. When necessary, FIGS. 1–3 are referenced in the discussion of FIG. 4. The method 400 of FIG. 4 is entered into at step 405. At step 410, the network search tool 147 is initialized in order to begin handling network events. At step 415, network search tool 147 receives a next event. Illustratively, the next event may include a search query submitted by client computer 122 at step 355.

At step 420, the network search tool 147 determines whether the event is a search query. If the event is not a search query, the event is handled by known methods at step 440. The events handled at step 440 include forwarding consecutive search result pages to the browser 140 as will be described below with reference to FIG. 5. Subsequently, the method 400 returns to step 415. If method 400 detects a search query event, then method 400 proceeds to step 425 to search the network 126. Following the search, the method 400 returns to step 415 to retrieve the next event. Embodiments of the network search at step 425 are described below with reference to FIG. 5.

Figure 5:
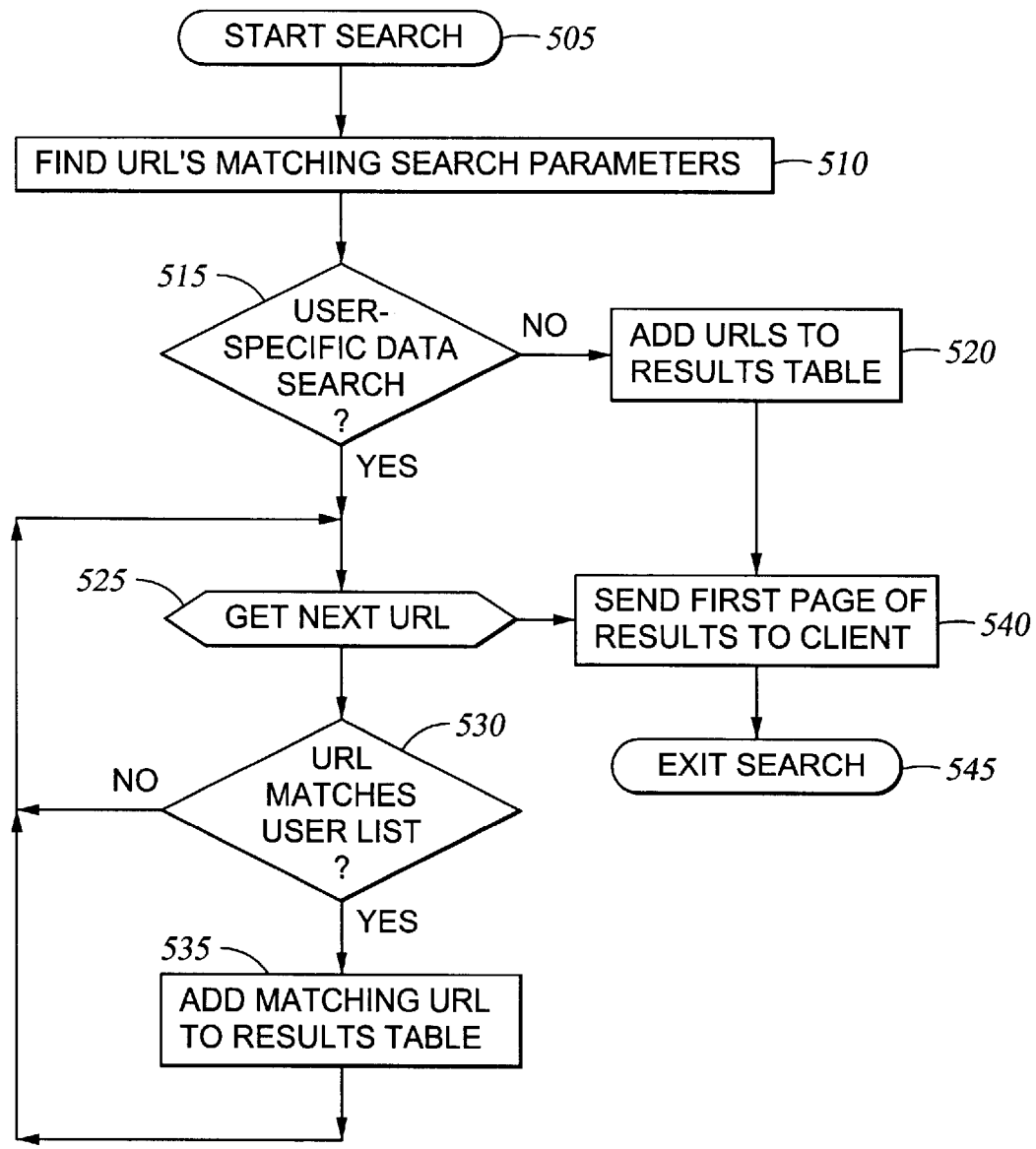
FIG. 5 depicts the search process used by a network search tool comparing user-specific data and network search results.

FIG. 5 depicts a flow diagram of a method 500 detailing one embodiment of step 425. FIGS. 1–4 are referenced in the following discussion of FIG. 5 as necessary. FIG. 5 depicts a method 500 for searching the network 126 with search tool 147 in response to a search query, comparing the search results with user-specific data 133 using a network address comparison routine 149, and submitting the results of the comparison to the browser program 140 for display.

The method of FIG. 5 is entered into at step 505, when the network search tool 147 initiates a search (see step 425 in FIG. 4) in response to a search query. At step 510 network data and indexes known to network search tool 147 are searched in reference to the search query received. The network addresses matching the search query are found by the search tool 147, and search results are then prepared for comparison, or sent to the browser program 140 as discussed below.

At step 515, the network search tool 147 detects if user-specific search was selected (i.e. check box 220). If a search of user-specific data 133 has not been selected, then method 500 proceeds to step 520. At step 520, all of the search results from step 510 are added to a results table 131 and method 500 proceeds to step 540 as described below. In the event that a search of user-specific data 133 has been selected at step 515, the search tool 147 proceeds to step 525 and retrieves a network address from the network search results generated at step 510. If there are no more network addresses to compare, then method 500 proceeds to step 540 described below. In the event that there is a network address to compare, method 500 proceeds to step 530.

At step 530, the address comparison routine 149 is activated and the network addresses contained in the user-specific data 133 obtained from the browser program 140 at step 355 are compared to the network search results obtained from step 510 for matching network addresses. Results of matching network addresses are stored in the results table 131 at step 535. Subsequently, method 500 loops from step 535 to step 525 until all of the network address results from the network search (performed at step 510) have been received and compared by the address comparison routine 149 to the user-specific data 133.

The loop comprising steps 525, 530 and 535 is repeated until all the URLs generated at step 510 processed. Then method 500 then proceeds from step 525 to step 540. At step 540, a first page of results from results table 131 comprising data derived from step 520 or 535 is transmitted to browser program 140 for display. Method 500 exits at step 545 and returns to step 415 of method 400.

In the event of multiple results pages (i.e., in addition to the first page sent at step 540), each page is sent successively to the browser 140 at step 440 (e.g., in response to a user request) as noted above. Step 440 may be repeated until all pages of results from results table 131 have been transmitted to the browser program 140.

Although various embodiments which incorporate the teachings of the present invention have been shown and described in detail herein, those skilled in the art can readily devise many other varied embodiments that still incorporate these teachings. For example, while the present invention has been primarily described within the context of searching user-specific data 133 files, it will be appreciated by those skilled in the art that the invention has broad applicability with regard to searching for other user-specific data files, either resident on the user's computer, or a network such as the Internet.

Another aspect of the invention involves the use of local search tool 141. In one embodiment, user-specific data 133 is transmitted to the local search tool 141 from the browser program 140. The local search tool 141 receives the network search results obtained by the network search tool 147 (which performs a conventional search) and compares the network search results with the user-specific data 133. The local search tool 147 generates a list of matching network address for display on browser program 140 in a manner similar to that outlined in steps 540 through 542 of method 500.

In another embodiment, local search tool 141 actively searches the network 126 for network addresses matching the query upon receiving a search query. Upon finding network addresses matching the search query local search tool 141, parses, indexes, and prepares the search results for comparison to user-specific data. The local search tool 141 then implements method 500 (see FIG. 5) and compares the results of the network search to the user-specific data 133. The local search tool 141 may implement steps 540 through 545 of method 500 by generating a list of matching network addresses for display on browser program 140.

Another aspect of the present invention includes the local search tool 141 searching only the user-specific data 133 for results that match the search query. Local search tool 141, upon receiving a search query, parses the query, and generates a list of matching search results for display on browser program 140. In this embodiment, only user-specific data 133 is searched. The local search tool 141 then generates a list of matching network addresses for display on browser program 140 in a manner similar to that outlined in steps 540 through 545 of method 500.

While the foregoing is directed to the preferred embodiment of the present invention, other and further embodiments of the invention may be devised without departing from the basic scope thereof, and the scope thereof is determined by the claims that follow.

What is claimed is:

1. A method for searching for information on a network of computers comprising a computer connected to the network of computers, the method comprising:
   receiving search request information by a first search tool;
   determining, by the first search tool, whether network information located on the network of computers satisfies the search request information;
   returning search results by the first search tool;
   determining whether one or more network addresses stored in memory associated with the computer satisfy the search results by comparing network addresses of the search results to the one or more network addresses; and
   returning, as results of the search request information, those one or more network addresses that match network addresses of the search results.

2. The method of claim 1, wherein the one or more network addresses comprises bookmarked network addresses contained in a data structure located in the memory.

3. The method of claim 1, wherein the one or more network addresses comprises previously-visited network addresses contained in a data structure located in the memory.

4. The method of claim 1, wherein providing the search request information to the first search tool comprises providing query data and the one or more network addresses to the first search tool; and wherein the comparing is performed by the first search tool.

5. The method of claim 1, wherein the first search tool is executing on the network of computers and wherein determining whether the one or more network addresses satisfy the search results is performed by a second search tool executing on the computer.

6. The method of claim 1, wherein the first search tool is located on the network of computers.

7. The method of claim 1 wherein determining whether the one or more network addresses satisfy the search results is a user-selectable step.

8. The method of claim 7, further comprising displaying only those one or more network addresses that match network addresses of the search results on a display connected to the computer.

9. The method of claim 1, wherein determining whether the one or more network addresses satisfy the search results is performed by a second search tool executing on the computer.

10. A signal-bearing media containing a search tool program which, when executed by a computer connected to a network of computers, causes at least one of the computer or the network of computers to perform the steps of:
   (a) parsing search request information;
   (b) determining whether network information located on the network of computers satisfies the search request information;
   (c) returning search results;
   (d) determining whether one or more network addresses stored in memory associated with the computer satisfy the search results by comparing network addresses of the search results to the one or more network addresses; and
   (e) returning, as results of the search request information, those one or more network addresses that match network addresses of the search results.

11. The search tool program of claim 10, wherein the one or more network addresses comprises bookmarked network addresses contained in a data structure located in the memory.

12. The search tool program of claim 10, wherein the one or more network addresses comprises previously-visited network addresses contained in a data structure located in the memory.

13. The search tool program of claim 10, wherein the steps (a)–(d) are performed by a search tool executing on the network of computers.

14. The search tool program of claim 10, wherein the steps (a)–(c) are performed by a first search tool executing on the network of computers and step (d) is performed by a second search tool executing on the computer.

15. The search tool program of claim 14, further comprising displaying only the results of the search request information via a graphical user interface of the computer.

16. A computer system comprising:

a computer comprising a processor and a memory a network of computers connected to the computer;

one or more search tools resident on at least one of the computer and the network of computers, wherein the one or more search tools, when executed, are configured to perform steps comprising:
(a) determine whether network information located on the network of computers satisfies a search query;
(b) if network information satisfies the search query, return search results;
(c) determine whether one or more network addresses stored in the memory match network addresses of the search results; and
(d) return, as results of the search query, those one or more network addresses that match the network addresses of the search results.

17. The system of claim 16, wherein the one or more search tools are integral to a browser program located on the computer.

18. The system of claim 16, wherein the network addresses comprise at least one of one or more bookmarked network addresses and previously-visited network addresses contained in a data structure located in the memory.

19. The system of claim 16, wherein the one or more search tools comprises a search tool executing on the network of computers.

20. The system of claim 16, wherein steps (a)–(b) are performed by a first search tool executing on the network of computers and step (c) is performed by a second search tool executing on the computer.

21. The system of claim 16, wherein the network of computers comprises the Internet.

22. The method of claim 1, wherein the network of computers is the Internet and the first search tool is a search engine on the Internet.

23. The search tool program of claim 10, wherein the network of computers is the Internet and the search tool program is a search engine on the Internet.

* * * * *